US000001025H

United States Statutory Invention Registration [19]

[11] Reg. Number: H1025

Dragonu, deceased et al.

[43] Published: Mar. 3, 1992

[54] MULTI-SONOBUOY LAUNCH CONTAINER WITH FLUID ACTUATOR

[75] Inventors: Leo Dragonu, deceased, late of Plymouth Meeting; by Elana D. Randall, executrix, West Chester; by N. Paige Kilkenny, executrix, Haverford, all of Pa.

[73] Assignee: The United States of America as represented by the Secretary of the Navy, Washington, D.C.

[21] Appl. No.: 554,310

[22] Filed: Jul. 18, 1990

[51] Int. Cl.[5] ..... B64D 1/04

[52] U.S. Cl. ..... 89/1.51; 89/1.81

[58] Field of Search ..... 89/1.51, 1.57, 1.81; 102/338, 340, 342, 351, 357, 438, 505; 244/137.1

[56] References Cited

U.S. PATENT DOCUMENTS

| | | | |
|---|---|---|---|
| 2,608,131 | 8/1952 | Pearce | 89/1.51 |
| 2,707,904 | 5/1955 | Strunk et al. | 89/1.51 |
| 2,723,093 | 4/1955 | Price et al. | 89/1.51 |
| 3,618,450 | 11/1971 | Fink et al. | 89/1.51 |
| 3,787,012 | 1/1974 | Jakubowski | 89/1.51 |
| 4,164,887 | 8/1979 | Ouellette | 89/1.51 |
| 4,397,433 | 8/1983 | Guitaut et al. | 89/1.51 |
| 4,444,085 | 4/1984 | Dragonuk | 89/1.51 |

*Primary Examiner*—Stephen C. Bentley
*Attorney, Agent, or Firm*—James V. Tura; James B. Bechtel; Susan E. Verona

[57] ABSTRACT

A multi-store launch container is disclosed wherein a plurality of stores, maintained in a tandem configuration therein, can be sequentially ejected. The container is normally carried by a vehicle and receives the necessary charges, of for instance pressurized gas, at its breach end through apparatus known in the art. A fluid-controlled flow valve maintains an open flow pathway through a first channel while blocking the opening to a second channel. After the first charge is fired, the diverter mechanism forces the flow valve to pivot and tightly shut the first primary channel and open the second primary channel to receive the next charge.

5 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2
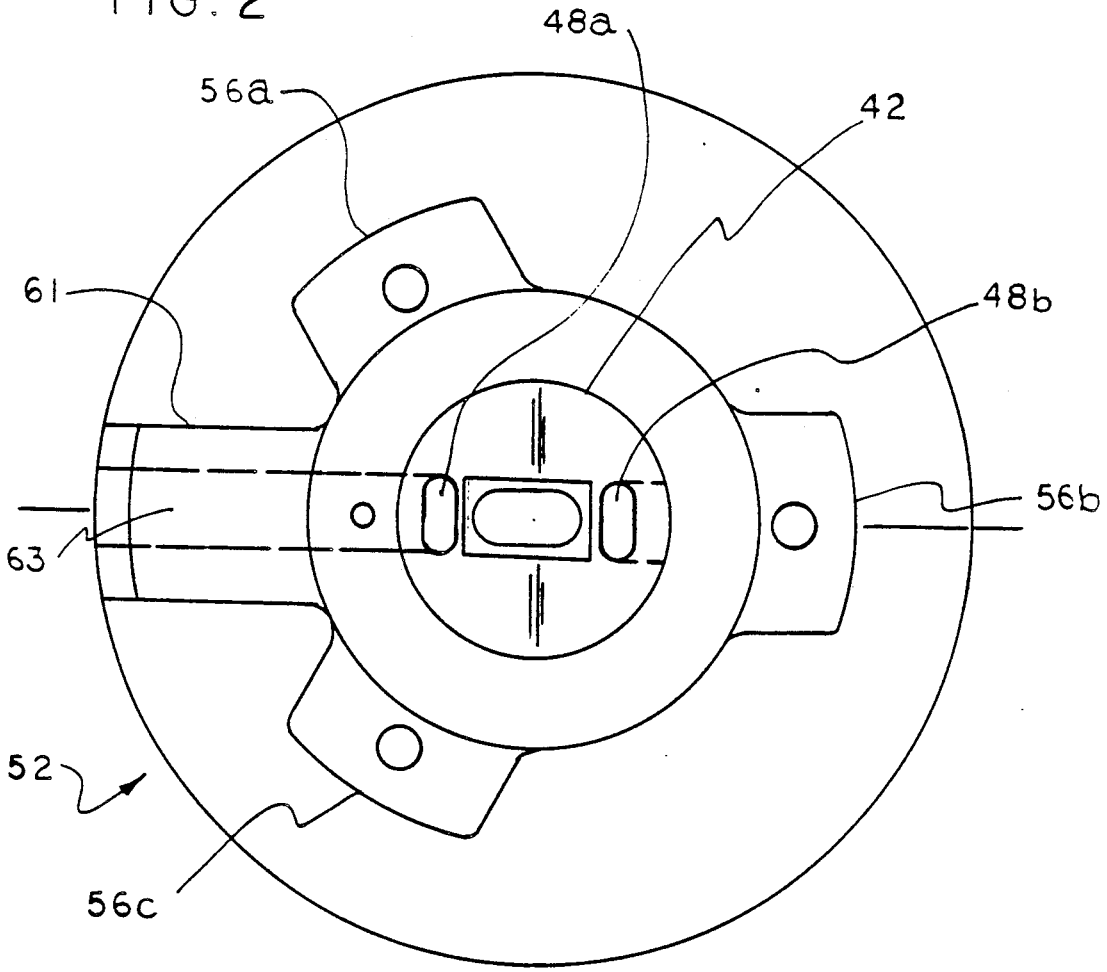
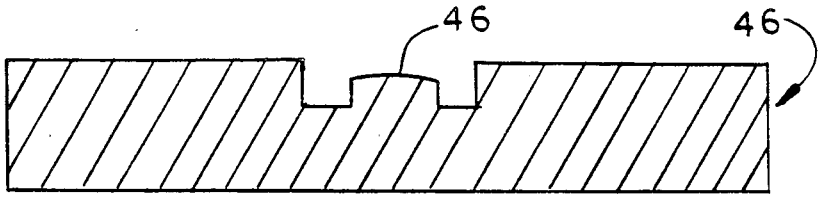
FIG. 6

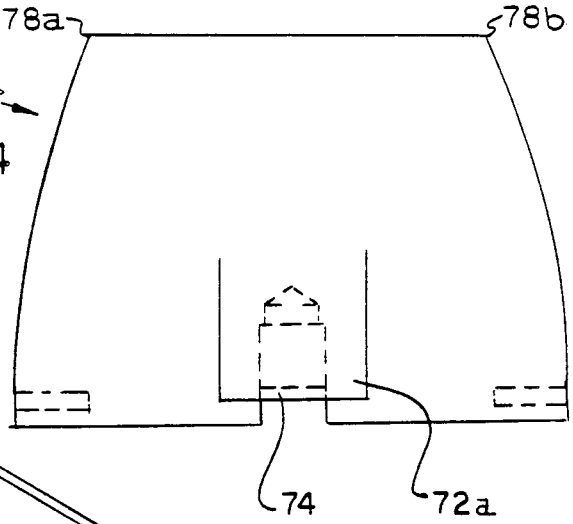
FIG.4
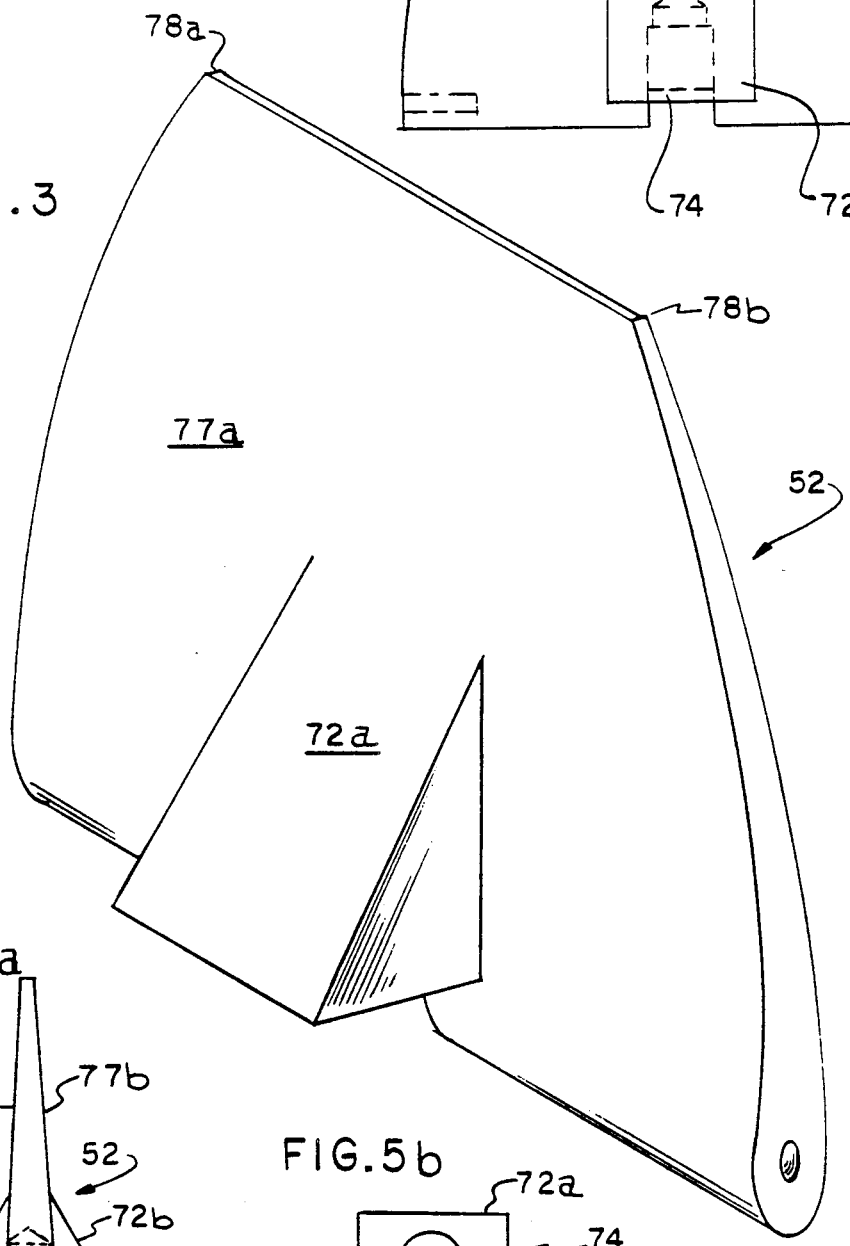
FIG.3
FIG 5a
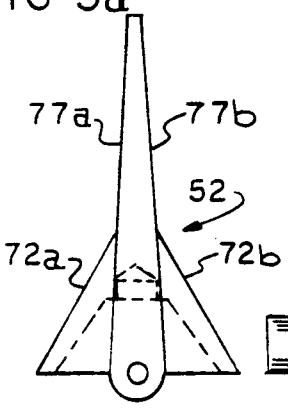
FIG.5b
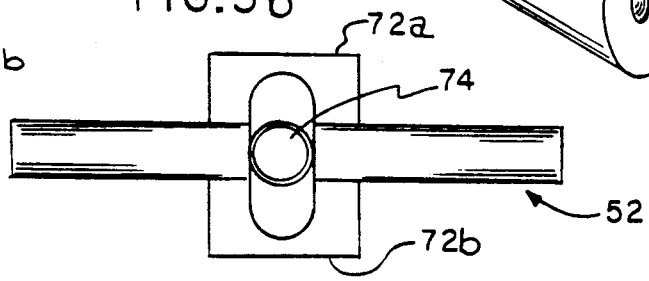

MULTI-SONOBUOY LAUNCH CONTAINER WITH FLUID ACTUATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention discloses a fluid-actuated multi-store dispenser wherein a fluid activated flow controller causes sequential launching of stores from their tandem position inside a launch container. In some environments, it is desirable to dispense multiple stores, for instance sonobuoys, in dense patterns. Due to physical limitations of space in the dispensing vehicle, an effort was made to miniaturize the active components inside the store and therefore reduce the overall outer dimensions thereof. Once the size of the store was reduced, in order to meet the demands of the denser patterns, the inside of the individual launch containers had to be modified to allow each to hold and dispense more than one store. Any new type of launch container, in addition to maintaining the size requirement dictated by the transporting vehicle, must be operated by the vehicle's pneumatic gas and electrical systems.

SUMMARY OF THE INVENTION

It is therefore an object of the present invention to develop an internal mechanism that will allow the carriage and dispensing of a plurality of stores from within a single launch container.

It is a further object of the invention to develop such an internal mechanism that can easily be retrofitted into the existing inventory of launch containers.

It is a still further object of the present invention to develop an internal mechanism that will permit the carriage and dispensing of a plurality of stores from within a single container without interfering with the safety or the reliability of either the dispensing vehicle or the container.

It is a still further object of the present invention to develop such an internal mechanism that will be relatively simple to manufacture, install and maintain.

These and other objects of the invention are accomplished by a tubular store launch container, that is installed in a vehicle to receive a fluid charge into its breech end and that contains a fluid-directing flow valve, at least two fluid channels for directing the fluid charge and a diverter mechanism that alternatingly covers first one channel and then the other. The stores are loaded into the container in tandem positions and a multi-channel flow valve pre-set to open access to a first, primary pathway and to close access to a second, primary pathway. Additionally, access is opened to a flow valve diverter pathway. The stores are removably sealed into the container to form an airtight package. At a predetermined signal, a first charge of gas flows into the flow valve, down the primary pathway and impacts against the inner end of the last-loaded store. Pressurized flow also travels into the flow diverter pathway and forces a diverter cylinder across a predetermined distance. The movement of this cylinder unbalances a spring force and the resulting spring restoration force moves the valve from the second primary channel over to the first, thereby resulting in the closing of the first and opening of the second. Whenever the vehicle is ready to dispense the second store, a second charge will now flow through the second, primary pathway to the second store and against the inner surface thereof to force it from the container.

BRIEF DESCRIPTION OF THE DRAWINGS

FIG. 2 shows a cross-sectional view, taken along lines II—II of FIG. 1, showing a view of the upper, inside of the breach end of the launch container when the flow valve assembly has been removed;

FIG. 3 shows an isolated and enlarged perspective view of a part of the flow valve shown in FIG. 1;

FIG. 4 shows a front view of the flow valve shown in FIG. 3;

FIG. 5*a* shows a left-side view of the flow valve shown in FIG. 3;

FIG. 5*b* shows a bottom view of the flow valve shown in FIG. 3;

FIG. 6 shows an isolated cross-sectional view of the piston cylinder of FIG. 1;

DETAILED DESCRIPTION OF THE PREFERRED EMBODIMENT

Figure 1:
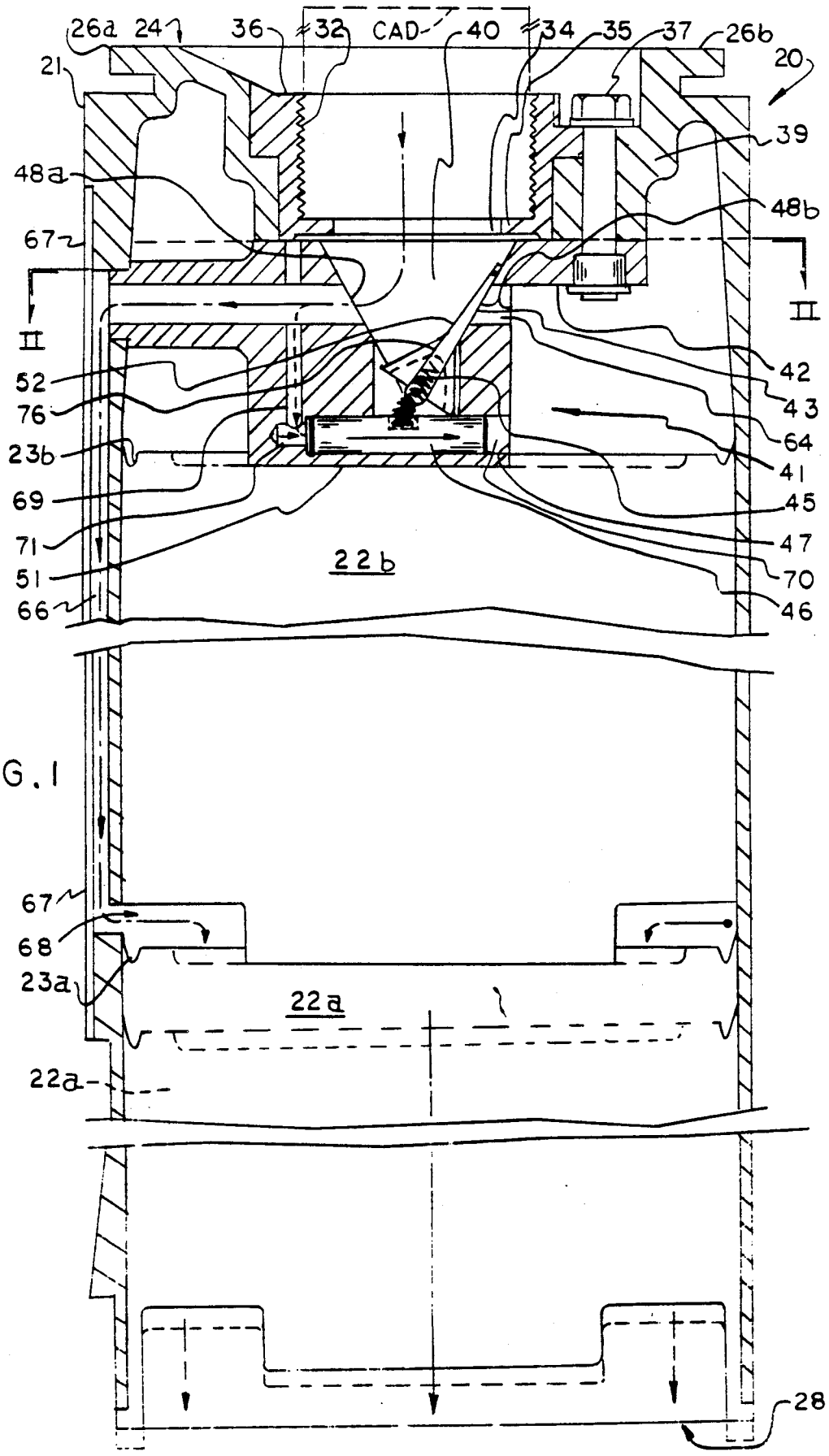
FIG. 1 shows a cross-sectional elevation view of a launch container, modified by the instant invention, with two stores contained therein and after a first charge has been fired.

Referring now to the drawings wherein like characters designate like or corresponding parts throughout the several views, there is shown in FIG. 1, a cross-sectional elevation view of a standard-size launch container 20, connected into the transporting vehicle (not shown in FIG. 1), with two stores 22*a*, 22*b* contained therein and after a first fluid charge (denoted by the fluid flow dashed arrows) has been fired from the vehicle. The charge can be either a pneumatic gas charge, such as is detailed in U.S. Pat. No. 4,444,085 which is incorporated herein by reference, or an explosive charge from what is commonly called a cartridge-activated-device, or CAD, as is known in the art. Launch container 20 is connected to the transport vehicle at its breach end 24 by locking lugs 26*a*, 26*b* being inserted into receptacles (not shown) in the vehicle, as is known, to thereby leave its discharge end 28 open to the environment. Launch container 20 can be made from molded ABS plastic or aluminum sheet, formed into a tubular sleeve of predetermined diameter and length, with the components at the breach end, as will be more fully described below, being made from molded plastic or other suitable materials. FIG. 2 shows a sectional view of launch container 20 taken along lines II—II of FIG. 1, showing container 20 with the breach end cap 21 removed.

A plenum chamber 32 to receive fluid charges, in the form of a cup, with a fluid charge aperture 34 through the central portion of the bottom 35, is affixed inside the breach end 24 of cap 21, as by one or more fasteners 37. The charge supplying mechanism (such as, for instance, a CAD, as shown in phantom) can be conveniently attached thereto, as by mating threads therefrom to the threads 36 on the inner surface of the chamber walls. Fasteners 37, for instance a bolt and nut combination shown in FIG. 1, fix the side tab 39 of chamber 32 to cap 21 and to flow valve means 41. Valve means 41 is rigidly secured, near the breach end, to the inside of container 20, as shown, and consists of a flow valve housing 42, a centrally-located flow valve 43 connected by a biasing means, such as a spring 45, to a piston cylinder 46 that reciprocates inside of aperture 47, a radially-located securing section to capture fastener 37 and oppositely-extending port sections 48*a*, 48*b*. The bottom peripheral edge and surface 51 of housing 42 provides a charge-deflecting guide to properly direct the charge around the outer perimeter of the innermost store to bring the firing force to bear evenly on the store as it is discharged from container 20. Each store 22*b*, 22*a* is inserted inside container 20 so that its upper rim 23*b*, 23*a*, respectively, forms a hermetic seal, to be broken only when sufficient charge pressure accumulates, between the inner surface of the walls of container 20 and the rim. If desired, a disc of foam padding can be inserted atop each store (not shown) to prevent damage to the top surface thereof while the store is being carried in container 20. Charge collection chamber 40, situated immediately below plenum chamber 32, collects the charge and allows it to be diverted to different ports, such as port 48*a* or port 48*b*, as will be described.

Two of the key components of the present invention are the flow valve means 41 and the attached piston cylinder mechanism 46, 47, both shown in FIG. 1 in their initial positions. Flow valve means 41 is comprised of spring-loaded flow valve 52, as shown in separate views in FIGS. 3, 4, 5*a* and 5*b* and housing 42 for twin ports 48*a* and 48*b*, shown more clearly in FIG. 2. Valve 52, as seen in cross-section in FIG. 1 and in a plan view in FIG. 2, is essentially in the shape of a right circular cylinder with a conical collection chamber 40 oriented at the central axis thereof. It has a wing section 61 extending from its central section, and section 61 carries a channel 63 to define a flow path port 48*a* for the first fluid charge, as will be discussed. As can be seen in FIG. 2, valve 52 has three extension tabs 56*a*, 56*b* and 56*c* to receive fasteners 37 and thereby secure cap 21 to housing 52. Valve 52 is fixedly held inside container 20 so that channel 63 is aligned with a passageway 66 along a predefined corridor extending longitudinally inside launch container shell 67. Passageway 66 connects channel 63 with an aperture 68 in the side wall of container 20 for a purpose to be explained. In a similar fashion, a much shorter channel 64 leads from port 48*b* to a unique open area immediately adjacent the top surface of store 22*b*, and a smaller channel 69 branches off from channel 63, as seen in FIG. 1. Channel 69 connects the fluid flow channel 63 to an area immediately adjacent cylinder 46. Cylinder 46 slidingly fits into passageway 70 where it can reciprocate from one side to the other.

Valve 52, as can be seen more clearly in FIGS. 3, 4, 5*a* and 5*b*, is a relatively flat, semi-rectangular shaped device that has a centrally located pyramidal, or thickened, part 72*a*,72*b* at the bottom or proximal end. A hollowed-out inner section in part 72*a*, *b* contains a guiding ring 74 that captures the upper end of a compression spring 76. The other end of spring 76 is fixedly held by cylinder 46, by projection 46*a*, as seen in FIG. 6, and the spring 76 keeps valve 52 a predetermined distance above the upper surface of cylinder 46. Opposite sides 77*a*, 77*b* of valve 52 are ground flat and towards the distal end, are tapered at the corners 78*a*, 78*b*. Valve 52 is connected to spring 76, which, in turn, is connected to projection 46*a* on cylinder 46. Cylinder 46 is initially set adjacent the end of channel 69 to imbalance, and make off-center, the location of the upper end of spring 76, which is fixed inside valve 52. This imbalance causes valve 52 to be forced against, and sealingly cover, port 48*b*, as shown in FIG. 1. As will be explained, the opposite sides 77*a*, 77*b* of valve 52 alternatingly seal ports 48*a*, 48*b* as fluid charges move cylinder 46.

Figure 7:
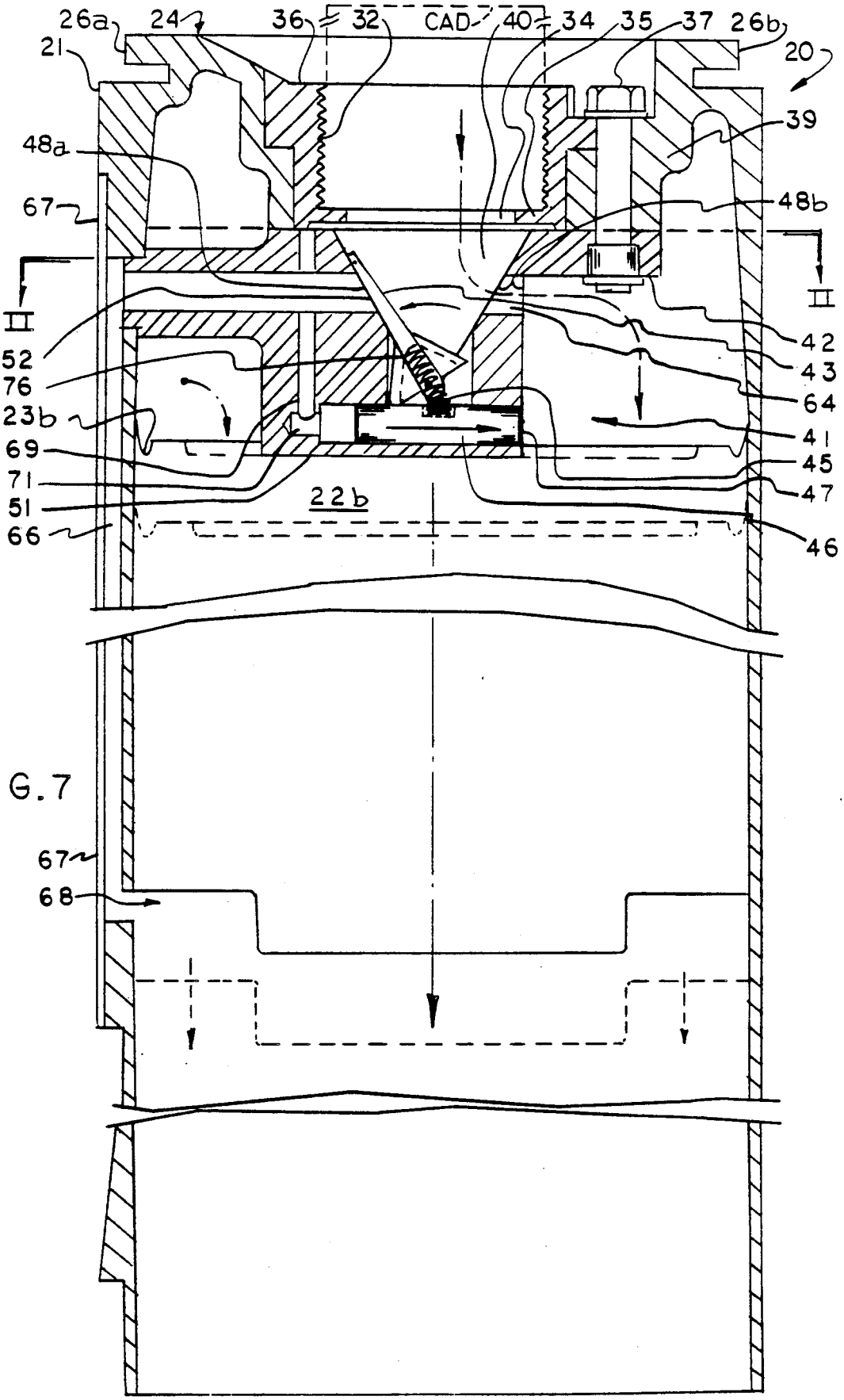
FIG. 7 shows a cross-sectional elevation view, similar to FIG. 1, after one store has been ejected and depicting a second charge (shown by the dashed arrow) firing the innermost store.
Figure 8:
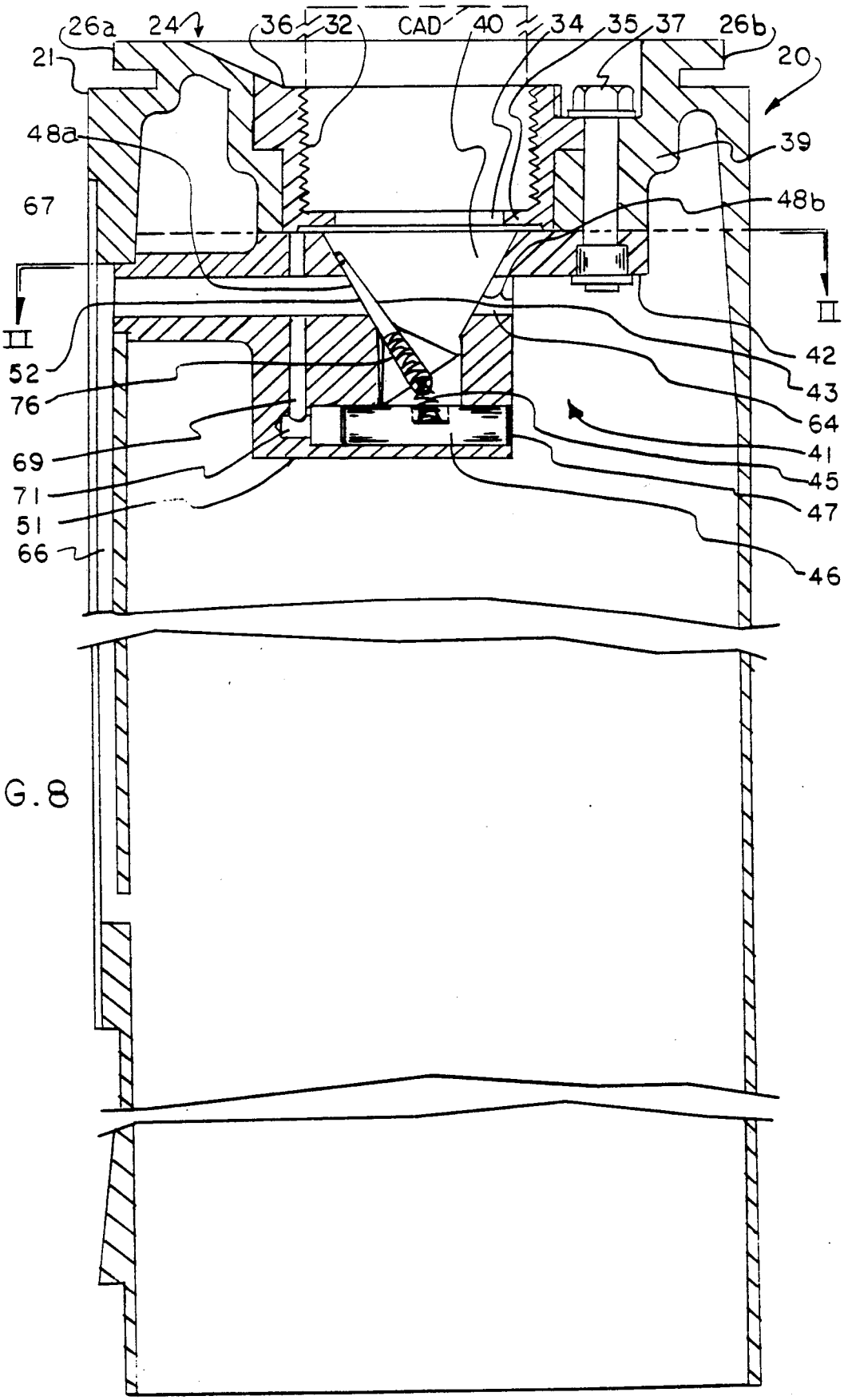
FIG. 8 shows a view similar to FIG. 6 depicting the resulting empty launch container after all stores have been ejected.

The action and reaction of the multi-store launch container can be more easily understood with reference to FIGS. 1, 7 and 8. Launch container 20 is loaded with first store 22*b* and then store 22*a*.

When the first charge (as depicted by the dashed arrows) enters plenum chamber 32 and then collection chamber 45, it is free to only proceed through port 48*a* and out channel 63 and down channel 66. Valve 52 is initially closed over port 48*b* and the pressure from the first charge causes it to remain in that position, where it continues to cover port 48*b*. The charge will be forced down the corridor that is channel 66 and through aperture 68 and to the unique area around the perimeter of store 22*a*. The pressure from the charge will build until it is sufficient to overcome shear tabs (not shown) that are holding store 22*a* inside container 20. Store 22*a* will leave container 20 (as shown by the arrows at the lower end thereof depicting movement and the phantom lines showing store 22*a* in a second position). Additionally, a portion of this first charge will also move through channel 69 to the small bore 71 adjacent cylinder 46, and once sufficient pressure has built up in this area, start to move, or reciprocate, cylinder 46 to the opposite end of passageway 70. The movement of cylinder 46 shifts projection 46*a*, which causes a further contortion of spring 76. Due to the natural restoring spring force in spring 76, and due to the fact that cylinder 46 is heavier than valve 52, the upper end of spring 76 reacts to the contortion by tending to move to the opposite side of chamber 40 to completely close, and seal, port 48*a*, thereby completely opening port 48*b*, as seen in FIG. 7. The flat surface 77*a* of valve 52 conforms to the edges of port 48*a*. Now that port 48*b* is open, and port 48*a* is closed, a subsequent charge (as seen by the dashed arrows in FIG. 7) will flow through plenum chamber 32, into chamber 40 and out through port 48*b*. This charge will be diverted, once it reaches the inner surface of store 22*b*, by ring 46 to flow over the surface of the perimeter of store 22*b*. once sufficient pressure, to overcome shear tabs (not shown) constraining store 22*b* inside container 20, builds up, the tabs will be broken and store 22*b* will be ejected. The empty launch container 20 is shown in FIG. 8.

Obviously, other embodiments and modifications of the present invention will readily come to those of ordinary skill in the art having the benefit of the teachings presented in the foregoing description and drawings. It is therefore to be understood that various changes in the details, materials, steps, and arrangements of parts, which have been described and illustrated to explain the nature of the invention, may be made by those skilled in the art within the principle and scope of the invention as expressed in the appended claims.

What I claim is:

1. A fluid-activated launcher system, connected to receive fluid charges, for sequentially ejecting stores releasably held in tandem position in a launch container, comprising:

a. a launch tube, having a breach end and a discharge end, loaded with a plurality of stores for ejection through the discharge end;

b. fluid producing means connected to said breach end to produce predetermined charges of fluid into said launch tube; and c. flow valve means comprising a plurality of channels, each said channel connecting said fluid producing means to a unique area adjacent a store;

channel cover means pivotally connected to oscillate from a sealing position over a first primary channel to a sealing position over a second primary channel; and biasing means connected to said channel cover means to exert a predetermined force on said channel cover means connected to said fluid producing means to selectively divert the fluid charges to impact, sequentially, said plurality of stores.

2. A launcher system as described in claim 1 wherein said biasing means consists of a fluid-activated cylinder and a spring.

3. A launcher system as described in claim 2 wherein said fluid-activated cylinder reciprocates in a cylinder passageway adjacent said flow valve means.

4. A launcher system as described in claim 1 wherein said channel cover means comprises a flat, rectangular-shaped section.

5. A fluid-activated launch container for sequentially dispensing a plurality of stores, connected to receive a plurality of fluid charges, comprising:

a. a launch tube, having a breach end connected to a carrying craft to receive fluid charges and an oppositely-disposed discharge end, and being loaded with a plurality of stores for ejection through the discharge end;

b. a charge accumulation and distribution area;

c. a plurality of ports adjacent said area, each said port leading, through a separate channel, to a unique area adjacent one of said plurality of stores;

d. a cylinder to slidingly reciprocate from end to end in a passageway; and e. a valve cover biasingly mounted to said cylinder.

* * * * *